(12) United States Patent
Miller et al.

(10) Patent No.: US 8,237,554 B2
(45) Date of Patent: Aug. 7, 2012

(54) SYSTEM AND METHOD FOR PROGRAMMING KEYS TO VEHICLE TO ESTABLISH PRIMARY AND SECONDARY DRIVERS

(75) Inventors: Thomas Lee Miller, Ann Arbor, MI (US); Brian Bennie, Sterling Heights, MI (US); Scott Alan Watkins, Sterling Heights, MI (US); Michael L. Gusta, Northville, MI (US); Eric L. Reed, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 986 days.

(21) Appl. No.: 12/139,005

(22) Filed: Jun. 13, 2008

(65) Prior Publication Data
US 2009/0309697 A1 Dec. 17, 2009

(51) Int. Cl.
*B60R 25/10* (2006.01)
(52) U.S. Cl. ......... 340/426.36; 340/426.14; 340/426.13; 340/426.35; 340/461; 340/5.1; 340/5.21; 340/5.22; 340/426.28; 340/5.72
(58) Field of Classification Search .................. None
See application file for complete search history.

(56) References Cited

U.S. PATENT DOCUMENTS

| | | | |
|---|---|---|---|
| 4,972,182 A | 11/1990 | Novik et al. | |
| 5,416,471 A | 5/1995 | Treharne et al. | |
| 5,508,694 A | 4/1996 | Treharne et al. | |
| 5,621,380 A | 4/1997 | Mutoh et al. | |
| 5,879,454 A * | 3/1999 | Peng ............................ | 118/31.5 |
| 6,008,722 A | 12/1999 | Hirozawa et al. | |
| RE36,505 E | 1/2000 | Treharne et al. | |
| 6,160,488 A * | 12/2000 | Honda ......................... | 340/5.65 |
| 6,225,890 B1 | 5/2001 | Murphy | |
| 6,271,745 B1 * | 8/2001 | Anzai et al. .................. | 340/5.53 |
| 6,386,007 B1 | 5/2002 | Johnson et al. | |
| 6,430,488 B1 | 8/2002 | Goldman et al. | |
| 6,501,369 B1 * | 12/2002 | Treharne ...................... | 340/5.22 |
| 6,518,882 B2 | 2/2003 | Johnson et al. | |
| 6,633,090 B2 * | 10/2003 | Harter et al. ................. | 307/10.6 |
| 6,675,082 B2 | 1/2004 | Galli et al. | |
| 7,006,914 B1 | 2/2006 | Cahoom | |
| 7,038,331 B2 | 5/2006 | Yasukura | |
| 7,042,333 B2 | 5/2006 | Dix et al. | |

(Continued)

OTHER PUBLICATIONS http://www.fordf150.net/howtp/patskey.php, "Program A New PATS Key", Mar. 3, 2007.

(Continued)

*Primary Examiner* — Benjamin C Lee
*Assistant Examiner* — Curtis King
(74) *Attorney, Agent, or Firm* — Brooks Kushman P.C.; Jennifer M. Stec (57) ABSTRACT

In at least one embodiment, a method for programming keys to a vehicle to establish primary keys and secondary keys to control vehicle functionality is disclosed. The method comprises receiving a key identification signal from a first key. The method further comprises generating a key status signal indicative of whether the first key is one of a primary key and a secondary key in response to the key identification signal. The method further comprises transmitting the key status signal to a vehicle interface display. The method further comprises allowing a user to change a status of at least one of the first key and an additional key with the vehicle interface display in response to determining that the key status signal corresponds to the primary key.

21 Claims, 5 Drawing Sheets

U.S. PATENT DOCUMENTS

| | | |
|---|---|---|
| 7,075,409 B2 | 7/2006 | Guba |
| 7,212,099 B2 | 5/2007 | Zhai |
| 2002/0133716 A1 | 9/2002 | Harif |
| 2004/0075530 A1 | 4/2004 | Ghabra et al. |
| 2004/0263316 A1* | 12/2004 | Dix et al. ............. 340/5.23 |
| 2005/0012590 A1 | 1/2005 | Metlitzky et al. |
| 2006/0114101 A1 | 6/2006 | Schambeck et al. |
| 2006/0184289 A1* | 8/2006 | Sorensen et al. ............ 701/2 |

OTHER PUBLICATIONS

China Office Action for corresponding Application No. 2012042700829970, mailed May 3, 2012, 5 pages.

* cited by examiner

SYSTEM AND METHOD FOR PROGRAMMING KEYS TO VEHICLE TO ESTABLISH PRIMARY AND SECONDARY DRIVERS

BACKGROUND

1. Technical Field

The embodiments described herein generally relate to a system and method for programming keys to a vehicle to establish primary and secondary drivers.

2. Background Art

With conventional automotive vehicles, one or more keys are often shared between any number of drivers. For example, the parents of a teenager (or young adult) that is old enough to drive may share the keys for the vehicle with the teenager. The vehicle may be equipped with various safety and/or driver notification features that may be enabled/disabled via a user interface based on the driver's needs. However, in some circumstances, the parent may not intend to have the various safety and notification related features disabled by the teenager. The parent may enable the safety and notification features prior to allowing the teenager to drive the vehicle, however there is no guarantee that the teenager may keep the safety and notification features enabled while driving the vehicle. Conventional vehicles fail to give parents, or other such primary driver, the option of preventing teenagers eligible to driver or other such secondary drivers from disabling safety and notification features.

In light of the foregoing, it is generally necessary to differentiate between the drivers so that a determination can be made as to when a particular vehicle system should prevent the disabling of such safety and notification features (or other features) in the event the driver is detected to be a teenager or other such secondary driver. Further, such a determination may be needed to ensure that the primary driver is allowed to disable the safety and notification features as desired. As recognized, the safety and notification features are generally arranged such that a primary driver may disable the features in the event such features are not desired and are not mandatorily imposed by law or other such ordinance.

SUMMARY

In at least one embodiment, a method for programming keys to a vehicle to establish primary keys and secondary keys to control vehicle functionality is disclosed. The method comprises receiving a key identification signal from a first key. The method further comprises generating a key status signal indicative of whether the first key is one of a primary key and a secondary key in response to the key identification signal. The method further comprises transmitting the key status signal to a vehicle interface display. The method further comprises allowing a user to change a status of at least one of the first key and an additional key with the vehicle interface display in response to determining that the key status signal corresponds to the primary key.

DETAILED DESCRIPTION

The embodiments of the present invention generally provides for a driver identification functional operation whereby primary and secondary drivers are determined and various levels of control are granted to the driver based on whether the driver is the primary driver or the secondary driver. In general, the primary driver may be defined as the administrative driver who has greater control over the functionality of the various safety and/or notification features in the vehicle. The secondary driver may be defined as a restricted driver who has limited control over the safety and/or notification features generally provided by the vehicle and is to abide by the functional restrictions imposed or selected by the vehicle or the primary driver. The embodiments of the present invention provide a system and method for allowing primary drivers the ability to program keys to the vehicle to designate a key as a secondary key for use by the secondary driver. The various operations that are capable of being controlled based on driver status include but are not limited to inhibiting a seatbelt restraint status disable, inhibiting a forward collision warning (FCW) disable, inhibiting an electronic stability control (ESC) disable, inhibiting a traction control (TC) disable, adjusting the operation of a low fluid level warning or low fuel level warning, inhibiting the user from inputting data via touch entry into communication devices, inhibiting blind spot monitoring (BSM) and cross traffic alert (CTA) disable.

The embodiments of the present invention as set forth in FIGS. 1-6 generally illustrate and describe a plurality of controllers (or modules), or other such electrically based components. All references to the various controllers and electrically based components and the functionality provided for each, are not intended to be limited to encompassing only what is illustrated and described herein. While particular labels may be assigned to the various controllers and/or electrical components disclosed, such labels are not intended to limit the scope of operation for the controllers and/or the electrical components. The controllers (or modules) may be combined with each other and/or separated in any manner based on the particular type of electrical architecture that is desired or intended to be implemented in the vehicle.

Figure 1:
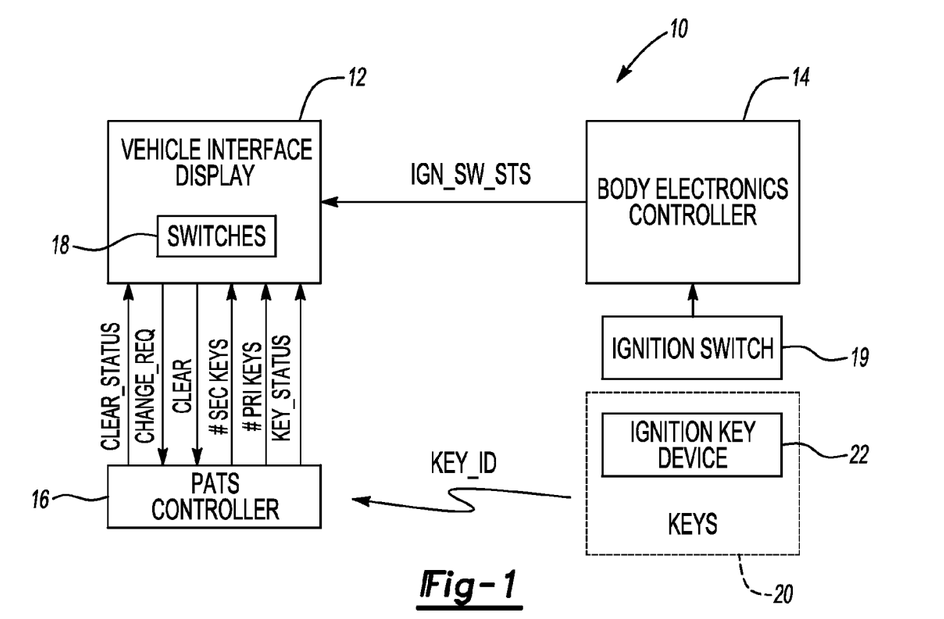
FIG. 1 depicts a system for programming keys to a vehicle to establish primary and secondary drivers in accordance to one embodiment of the present invention.

Referring now to FIG. 1, a system 10 for programming keys to a vehicle to establish primary and secondary drivers in accordance to one embodiment of the present invention is shown. The system 10 includes a vehicle interface display 12, a body electronics controller 14, and a passive anti-theft security (PATS) controller 16. The vehicle interface display 12 may be implemented as a message center on an instrument cluster or as a touch screen monitor such that each device is generally configured to present text, menu options, status or other such inquiries to the driver in a visual format. A driver may scroll through the various fields of text and select menu options via at least one switch 18 positioned about the interface display 12. The switch 18 may be remotely positioned from the interface display 12 or positioned directly on the interface display 12. The vehicle interface display 12 may be any such device that is generally situated to provide information and receive feedback to/from a vehicle occupant. The switches 18 may be in the form of voice commands, touch screen, and/or other such external devices (e.g., phones, computers, etc.) that are generally configured to communicate with the electrical system of the vehicle.

The interface display 12, the PATS controller 16, and the body electronics controller 14 may communicate with each other via a multiplexed data link communication bus (or multiplexed bus). The multiplexed bus may be implemented as a High/Medium Speed Controller Area Network (CAN) bus, a Local Interconnect Network (LIN), or any such suitable data link communication bus generally situated to facilitate data transfer between controllers (or modules) in the vehicle.

The body electronics controller 14 generally controls a portion or all of the electrical content in an interior section of the vehicle. In one example, the body electronics controller 14 may be a smart power distribution junction box (SPDJB) controller. The SPDJB controller may include a plurality of fuses, relays, and various micro-controllers for performing any number of functions related to the operation of interior and/or exterior electrically based vehicle functionality. Such functions may include but are not limited to electronic unlocking/locking (via interior door lock/unlock switches), remote keyless entry operation, vehicle lighting (interior and/or exterior), electronic power windows, and/or key ignition status (e.g., Off, Run, Start, Accessory (ACCY)).

An ignition switch 19 may be operably coupled to the body electronics controller 14. The body electronics controller 14 may receive hardwired signals indicative of the position of the ignition switch 34 and transmit multiplexed messages on the multiplexed bus that are indicative of the position of the ignition switch. For example, the body electronics controller 14 may transmit a signal IGN_SW_STS (e.g., whether the ignition is in the OFF, Run, Start, or Accessory (ACCY) positions) over the multiplexed bus to the vehicle interface display 12. The signal IGN_SW_STS generally corresponds to the position of the ignition switch (e.g., Off, Run, Start, or Accessory positions).

The ignition switch 19 may receive two or more keys 20 to start the vehicle. Each key 20 includes an ignition key device 22 embedded therein for communicating with the vehicle. The ignition key device 22 comprises a transponder (not shown). The transponder includes an integrated circuit and an antenna. The transponder is adapted to transmit a signal KEY_ID in the form of a radio frequency (RF) signal to the PATS controller 16. The signal KEY_ID generally comprises RF data that corresponds to a manufacturer code, a corresponding key serial number and encrypted data. The key serial number and the encrypted data are used to authorize the engine controller to start the vehicle in the event the encrypted data corresponds to predetermined encrypted data stored in a look up table (LUT) of the PATS controller 16. The PATS controller 16 may use the key number and/or the encrypted data transmitted on the signal KEY_ID to determine if the key is a primary key or a secondary key. In general, the driver who holds the primary key is presumed to be a primary driver. The driver who holds the secondary key is presumed to be a secondary driver. The manufacturer code generally corresponds to who the manufacturer of the vehicle is. For example, the manufacturer code may correspond to Ford Motor Company. Such a code prevents the user (or technician) from mistakenly configuring a key with a manufacturer code of another vehicle manufacturer to a Ford vehicle. An example of a LUT that may be stored in the PATS controller 16 is shown in TABLE 1 directly below.

TABLE 1

| KEY SERIAL # | MAN. CODE | ENCRYPTED DATA | TYPE |
|---|---|---|---|
| 1xxA | Ford | #$#$#$#$#$#$#$# | Primary |
| 2xxB | Ford | #######$$$$$$$$ | Secondary |
| 3xxC | Ford | $#$#$#$#$#$#$#$ | Secondary |
| NnnN | Ford | $$$$$$$######## | Primary |

The LUT may include any number of keys. To start the vehicle, the PATS controller 16 decodes the key serial number, the manufacturing code, and corresponding encrypted data received on the signal KEY_ID and compares such data to the key serial number and the encrypted data in the LUT to determine whether such data match prior to starting the vehicle for anti-theft purposes. In the event the data matches, the engine controller operably coupled to the PATS controller 16 allows the vehicle to start the engine.

To determine driver status, the PATS controller 16 decodes the key number and/or the encrypted data received on the signal KEY_ID and reads the corresponding key status (e.g., primary or secondary) next to the key number and/or the encrypted data as shown in the heading 'TYPE' of Table 1 to determine whether the key is the primary key or the secondary key. The PATS controller 16 transmits a signal KEY_STATUS to the vehicle interface display 12 to indicate whether the key is a primary key or a secondary key. The PATS controller 16 and/or the vehicle interface display 12 may transmit the signal KEY_STATUS to any controller or module in the electrical system such that the functionality or operation performed by a particular controller (or module) may be selectively controlled based on the key status (and/or the driver status). For example, seat belt minder, fuel level indicator, reverse park aid, object detection, and traction control as found in U.S. patent Ser. No. 12/026,582, entitled "SYSTEM AND METHOD FOR CONTROLLING A SAFETY RESTRAINT STATUS BASED ON DRIVER STATUS" and filed on Feb. 6, 2008; Ser. No. 12/026,857, entitled "SYSTEM AND METHOD FOR CONTROLLING EARLY LOW FUEL WARNING BASED ON DRIVER STATUS" and filed on Feb. 6, 2008; Ser. No. 12/026,867, entitled "SYSTEM AND METHOD FOR CONTROLLING ELECTRONIC STABILITY CONTROL BASED ON DRIVER STATUS" and filed on Feb. 6, 2008; and Ser. No. 12/026,872, entitled "SYSTEM AND METHOD FOR CONTROLLING OBJECT DETECTION BASED ON DRIVER STATUS" and filed on Feb. 6, 2008, all of which are hereby incorporated by reference in their entirety, and are illustrative of the types of functionality or operations that may be selectively controlled based on the driver status of the vehicle.

Additional functionality such as blind spot monitoring and cross traffic alert, preventing the user from inputting data via touch entry into the communication device, and preventing the user from disabling an emergency call feature as found in U.S. Patent Publication No. 2009/0312914, entitled "SYSTEM AND METHOD FOR CONTROLLING BLIND SPOT MONITORING AND CROSS TRAFFIC ALERT BASED ON DRIVER STATUS" and filed on and filed on Jun. 13, 2008, U.S. Patent Publication No. 2009/0312901, entitled "SYSTEM AND METHOD FOR CONTROLLING AN OCCUPANT COMMUNICATION DEVICE BASED ON DRIVER STATUS" and filed on Jun. 13, 2008, and U.S. Patent Publication No. 2009/0312902 entitled, "SYSTEM AND METHOD FOR CONTROLLING EMERGENCY NOTIFICATION OPERATION BASED ON DRIVER STATUS" and filed on Jun. 13, 2008, all of which are hereby incorporated by reference in their entirety are illustrative of the types of functionality or operations that may be selectively controlled based on the driver status of the vehicle.

The LUT in the PATS controller 16 assigns all of the keys as primary keys when the vehicle is manufactured in a default condition. The PATS controller 16 may update the key status for a key number in response to the driver changing the key status for a particular key via operations performed between the primary driver and the vehicle interface display 12. Such operations will be discussed in more detail in connection with FIGS. 3 and 6.

The primary driver may optionally clear all keys that were designated as secondary keys via the vehicle interface display 12. In such a case, the primary driver may select the corresponding menus via the vehicle interface display 12 to clear all keys that were programmed as secondary keys. The vehicle interface display 12 transmits a signal CLEAR to control the PATS controller 16 to clear (or change) the secondary keys to primary keys. The PATS controller 16 may transmit a signal CLEAR_STATUS to the vehicle interface display 12 to notify the vehicle interface display 12 that the keys programmed as secondary keys have been changed to primary keys. The PATS controller 16 transmits signals #PRIKEYS and #SECKEYS to the interface display 12 which are indicative of the number of primary keys in the LUT and the number of secondary keys in the LUT, respectively. The PATS controller 16 transmits the signals #PRIKEYS and #SECKEYS in response to control signals (not shown) by the vehicle interface display 12. It is generally contemplated that the signals KEY_STATUS, #PRIKEYS, and #SECKEYS (as well as the signal CLEAR_STATUS) may be sent as one or more messages over the multiplexed bus to the vehicle interface display 12. For example, the data on the signals KEY_STATUS, #PRIKEYS, #SECKEYS, CLEAR_STATUS may be transmitted as hexadecimal based data within a single message over the multiplexed data bus. Likewise, the vehicle interface display 12 may transmit the data on the signals CHANGE_REQ and CLEAR as hexadecimal based data within a single message over the multiplexed data bus. The PATS controller 16 may be integrated within the vehicle interface display 12 or be implemented as a standalone component or as controller embedded within another controller in the vehicle.

Figure 2:
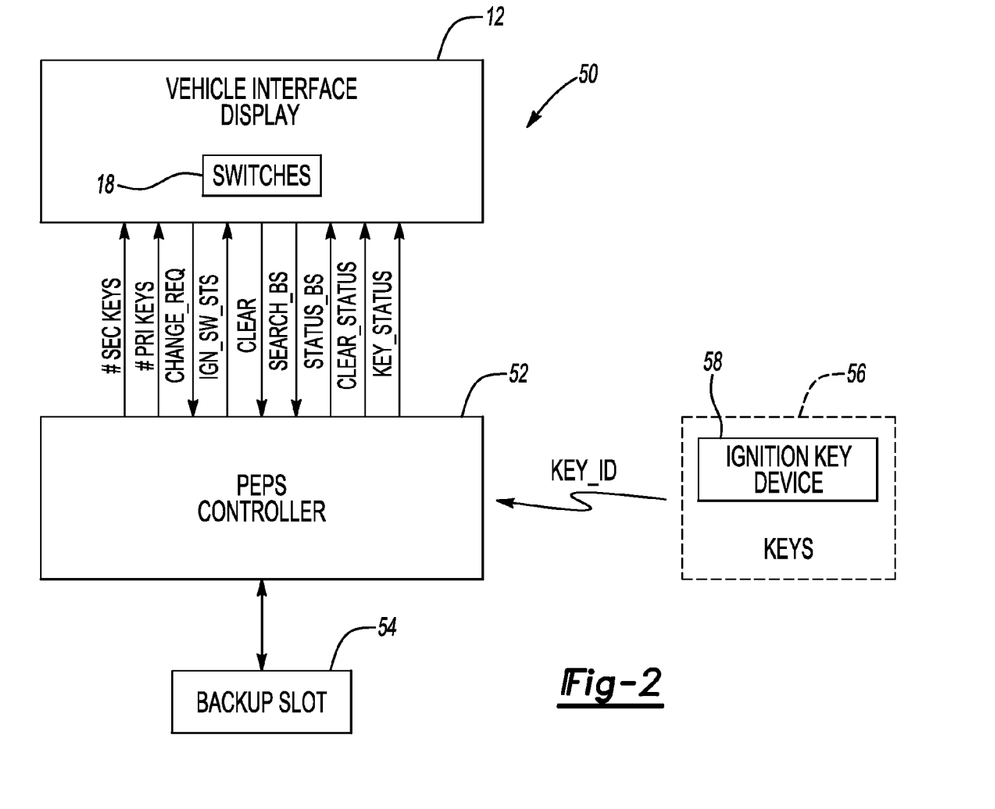
FIG. 2 depicts a system for programming keys to a vehicle to establish primary and secondary drivers in accordance to another embodiment of the present invention.

Referring now to FIG. 2, a system 50 for programming keys to a vehicle to establish primary and secondary drivers in accordance to one embodiment of the present invention is shown. The system 50 includes the vehicle interface display 12, a passive entry passive start (PEPS) controller 52, and a backup slot 54. The PEPS controller 52 may be used in place of the PATS controller 16 as illustrated in FIG. 1. While FIG. 2 generally illustrates that the PEPS controller 52 is positioned external to the vehicle interface display 12, other such implementations may include positioning the PEPS controller 52 within the vehicle interface display 12 or within any other such controller in the vehicle. The particular placement of the PEPS controller 52 may vary based on the desired criteria of a particular implementation.

In general, the PEPS function is a keyless access and start system. The driver may own two or more keys 56 that may be in the form of an electronic transmission device (e.g., a key fob). With the PEPS implementation, the user is not required to use a mechanical key blade to open the door of the vehicle or to start the vehicle. Such key 56 may each include a mechanical key to ensure that the driver can access and start the vehicle in the event the keys 56 exhibit low battery power. The keys 56 each include an ignition key device 58 embedded within for communicating with the PEPS controller 52. The transponder of the ignition key device 58 is adapted to send the key number and encrypted data on the signal KEY_ID as an RF signal to the PEPS controller 52. To gain access or entry into the vehicle with the keys 56 in the PEPS implementation, the driver may need to wake up the PEPS controller 52 to establish bi-directional communication between the keys 56 and the PEPS controller 52. In one example, such a wake up may occur by requiring the driver to touch and/or pull the door handle of the vehicle. In response to the door handle being toggled or touched, the PEPS controller 52 may wake up and transmit RF based signals to the keys 56. The PEPS controller 52 and the keys 56 may undergo a series of communications back and forth to each other (e.g., handshaking) for vehicle access authentication purposes. The PEPS controller 52 may unlock the doors in response to a successful completion of the handshaking process. Once the driver is in the vehicle, the driver may simply press a button positioned on an instrument panel to start the vehicle.

Prior to starting the vehicle, the key serial number and the encrypted data are compared to known key numbers and/or encrypted data in a PEPS look up table in a manner similar to that described in connection with FIG. 1. The manufacturing code is also checked to ensure the key is used for a particular manufacturer of the vehicle. The PEPS LUT may be similar to the PATS LUT as shown in Table 1. As noted above, additional operations are performed as exhibited with the handshaking exercise in addition to matching the data received on the signal KEY_ID with the data in the LUT (e.g., key serial number and encryption data) to ensure that the user is properly authorized to enter the vehicle and to start the vehicle with the PEPS implementation. As noted above in connection with FIG. 1, all of the keys are generally assigned a primary key status when the vehicle is built and while the vehicle is in transit from the manufacturing plant to the dealer. Such a condition will be reflected under the 'TYPE' heading as shown in Table 1. The status of the key will change from primary to secondary in response to the user programming a particular key via the vehicle interface display 12. As further noted above, the PEPS controller 52 ascertains the key status (or driver status) of the key (e.g., whether primary or secondary) by decoding the key number and/or encrypted data received on the signal KEY_ID and looking up the corresponding key type (e.g., primary or secondary) under the 'TYPE' heading of the LUT. The PEPS controller 52 is configured to transmit the signal KEY_STATUS on the multiplexed bus to the vehicle interface display 12. The PEPS controller 52 and/or the vehicle interface display 12 may transmit the signal KEY_STATUS to any controller or module in the vehicle so that the functionality or operation performed by a particular controller (or module) may be selectively controlled based on the driver status.

The PEPS controller 52 may also transmit the signal IGN_SW_STS to the cluster 22. The PEPS controller 52 determines that the key ignition status is in the run position in response to the driver toggling the brake pedal and depressing the start switch. The driver may designate (or program) a particular key as a secondary key. In such a case, the vehicle interface display 12 may prompt the driver to place the key 56 on the backup slot 54 to program that particular key so that the driver knows which key is being programmed as a secondary key. Such a condition takes into account that the driver may have two or more keys in the vehicle while programming a key as a secondary key. The vehicle interface display 12 may send a command signal SEARCH_BS to the PEPS controller 52 to determine whether the user placed the key 56 on the back up slot 54. It is generally contemplated that a key used to first gain access to the vehicle or to authenticate starting the vehicle may not be necessarily the key that is placed on the backup slot 54. For example, another or additional key (e.g. key not used to gain entry into the vehicle or start the vehicle) may be placed on the back up slot 54 for programming. In such an example, the additional key may transmit the signal KEY_ID prior to programming to the PEPS controller 52 while on the back up slot 54.

The PEPS controller 52 transmits a signal STATUS_BS to the vehicle interface display 12. The signal STATUS_BS generally corresponds to whether the user has placed the particular key that is to be programmed as a secondary driver on the backup slot 54. It is generally contemplated that the backup slot 54 may be coupled directly to the vehicle interface display 12 instead of the PEPS controller 52. The PEPS controller 52 may transmit the signals IGN_SW_STS, STATUS_BS and KEY_STATUS over the multiplexed bus to the vehicle interface display 12. The operation of placing the key 56 that is desired to be programmed on the backup slot 54 as a secondary key is optional. Other such implementations may instead program the key that was used to unlock the vehicle and start the engine of the vehicle.

In general, the PEPS controller 52 may update the value under the 'TYPE' heading of Table 1 for a particular key from a primary to secondary key in response to the user programming the key as a secondary key via the vehicle interface display 12 and/or the user placing the key that is desired to be programmed on the backup slot 54. The operation of changing the status of the key from a primary key to a secondary key will be discussed in more detail in connection with FIGS. 4 and 6.

The driver may optionally clear all keys that were designated as secondary keys via the vehicle interface display 12. In such a case, the driver may select the corresponding menus via the vehicle interface display 12 to clear all keys that were programmed as secondary keys. The vehicle interface display 12 transmits the signal CLEAR to control the PEPS controller 52 to clear (or change) the secondary keys to primary keys. The PEPS controller 52 may transmit the signal CLEAR_STATUS to the vehicle interface display 12 to notify the vehicle interface display 12 that the keys programmed as secondary keys have been changed to primary keys. The PEPS controller 52 transmits a signal #PRIKEYS and #SECKEYS to the vehicle interface display 12 which are indicative of the number of primary keys in the LUT and the number of secondary keys in the LUT, respectively. The PEPS controller 52 transmits the signals #PRIKEYS and #SECKEYS in response to control signals (not shown) by the vehicle interface display 12. It is generally contemplated that the signals KEY_STATUS, #PRIKEYS, and #SECKEYS (as well as the signal CLEAR_STATUS) may be transmitted as one or more messages over the multiplexed bus to the vehicle interface display 12. For example, the data on the signals KEY_STATUS, #PRIKEYS, #SECKEYS, and CLEAR_STATUS may be transmitted as hexadecimal based data within a signal message over the multiplexed data bus. Likewise, the vehicle interface display 12 may transmit the data on the signal CHANGE_REQ and CLEAR as hexadecimal based data within a single message over the multiplexed data bus.

Figure 3:
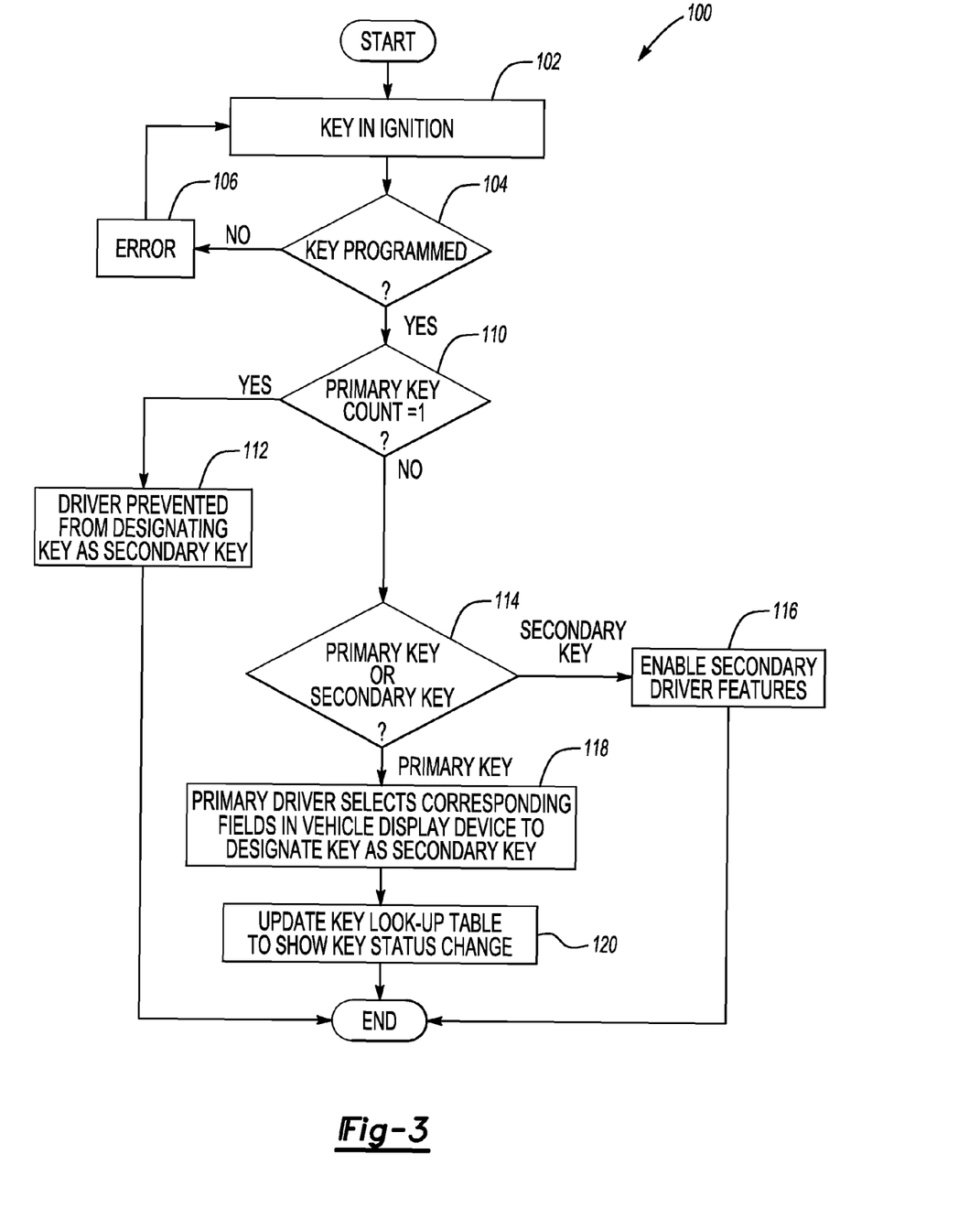
FIG. 3 depicts a method for programming keys to a vehicle to establish primary and secondary drivers in accordance to one embodiment of the present invention.

Referring now to FIG. 3, a method 100 for programming keys to a vehicle to establish primary and secondary drivers for a PATS implementation in accordance to one embodiment of the present invention is shown. The particular sequence of operations performed in method 100 may be performed in any manner and is not intended to be sequentially limited.

In block 102, the driver inserts the key into the ignition switch 19. The key ignition switch 19 transmits a signal that indicates the status of the ignition switch position to the body electronics controller 14. The body electronics controller 14 transmits the signal IGN_SW_STS over the multiplexed bus to the vehicle interface display 12.

In block 104, the keys are monitored to determine if the keys were programmed. For example, the PATS controller 16 is adapted to determine if the keys are properly programmed so that the vehicle can be started. In the event the keys are not properly programmed to start the vehicle, then the method 100 moves to block 106. In the event the keys are properly programmed to start the vehicle, then the method 100 moves to block 110. It is generally contemplated that the ignition status of the vehicle may be in the RUN or ACCY position to determine whether the keys are properly programmed.

In block 106, an error is detected. The PATS controller 16 determines an error and may not allow the driver to start the vehicle or to continue with programming the particular key that is in the ignition as a secondary key.

In block 110, the vehicle interface display 12 prompts the PATS controller 16 to determine the number of keys that are configured as primary keys. In such a case, the PATS controller 16 counts the number of keys that are programmed as a primary key via the LUT and transmits the signal #PRIKEYS to the vehicle interface display 12. In the event the number of primary keys is equal to one, then the method 100 moves to block 112. In the event the number of primary keys are greater than one, the method 100 moves to block 114.

In block 112, the driver is prevented from programming the current key in the ignition as a secondary key. The method 100 prevents a user from programming all of the keys as a secondary key via the vehicle interface display 12 to ensure that at least one key remains programmed as a primary key.

In block 114, the PATS controller 16 determines whether the key in the ignition is a primary key or a secondary key by cross-referencing the key number and/or encrypted data to the key designation as shown under the field 'TYPE' in the LUT. If the PATS controller 16 determines that the key is a secondary key, then the method 100 moves to block 116. If the PATS controller 16 determines that the key is a primary key, then the method 100 moves to block 118. The operation performed in block 114 may be performed prior to, at the same time, or after the operation performed in block 104.

In block 116, the vehicle interface display 12 transmits the signal KEY_STATUS which indicates that the driver is a secondary driver over the multiplexed communication bus to various modules or controllers that are adapted to enable secondary driver features. Again, such secondary driver features may include one or more of, but not limited to, inhibiting a seatbelt restraint status disable, inhibiting a forward collision warning (FCW) disable, inhibiting an electronic stability control (ESC) disable, inhibiting a traction control (TC) disable, adjusting the operation of a low fluid level warning or low fuel level warning, inhibiting blind spot monitoring and cross traffic alert disable, preventing the user from inputting data via touch entry into a communication device, and preventing the user from disabling the emergency notification feature.

In block 118, the driver selects corresponding fields in the vehicle interface display 12 to program the current key in the ignition as a secondary key. In general, the vehicle interface display 12 transmits the signal CHANGE_REQ to the PATS controller 16 to control the PATS controller 16 to change the status of the key from a primary key to a secondary key.

In block 120, the PATS controller 16 updates the 'TYPE' field in the LUT to change the designation for the particular key that is detected to be in the ignition switch from a primary key to a secondary key in response to the signal CHANGE_REQ.

Figure 4:
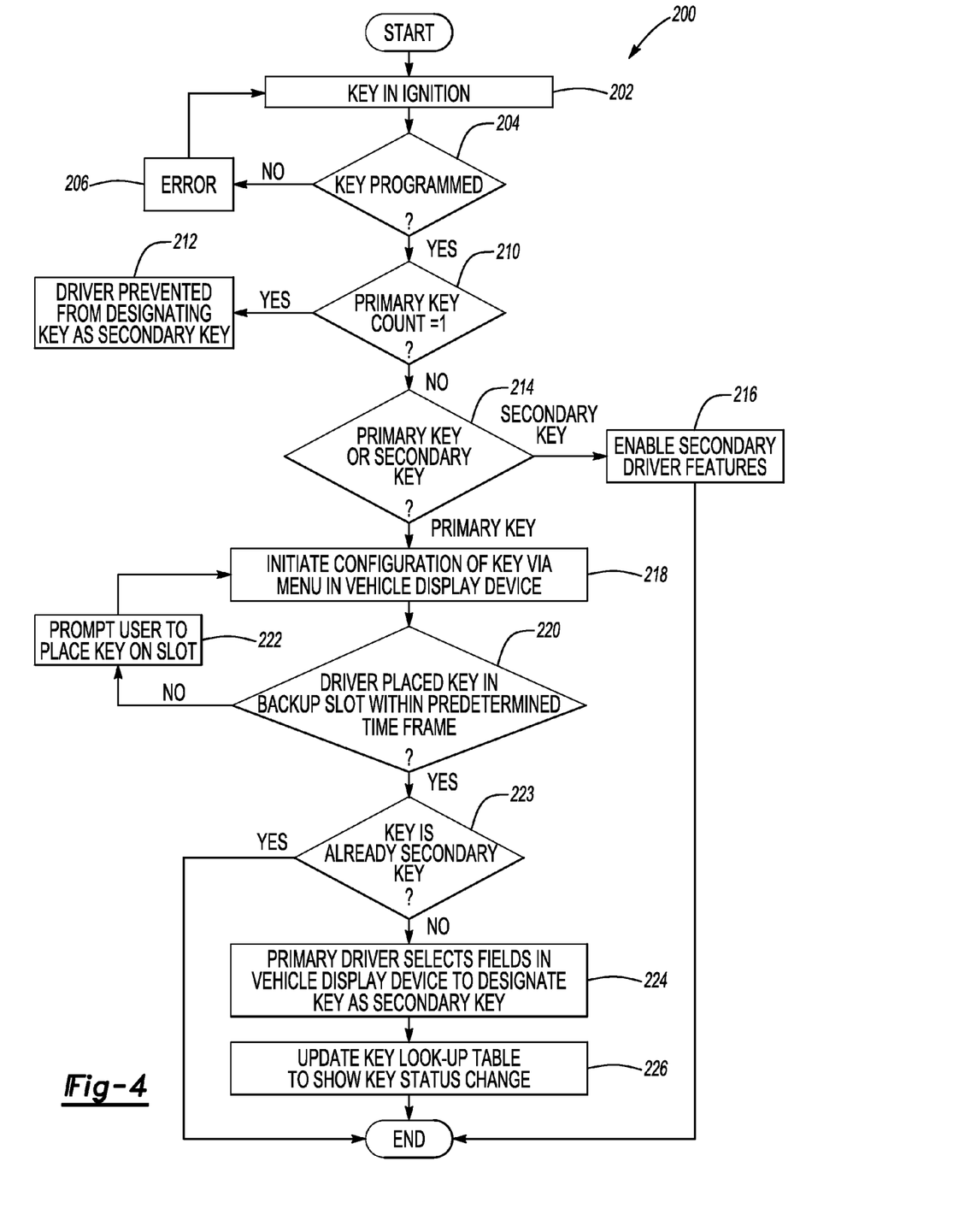
FIG. 4 depicts a method for programming keys to a vehicle to establish primary and secondary drivers in accordance to another embodiment of the present invention.

Referring now to FIG. 4, a method 200 for programming keys to a vehicle to establish primary and secondary drivers for a PEPS implementation in accordance to one embodiment of the present invention is shown. The particular sequence of operations performed in method 200 may be performed in any manner and is not intended to be sequentially limited.

In block 202, the PEPS controller 52 transmits the IGN_SW_STS over the multiplexed bus to the vehicle interface display 12.

In block 204, the keys are monitored to determine if the keys were programmed. For example, the PEPS controller 52 is adapted to determine if the keys are properly programmed so that the vehicle can be started. In the event the keys are not properly programmed to start the vehicle, then the method 200 moves to block 206. In the event the keys are properly programmed to start the vehicle, then the method 200 moves to block 210. It is generally contemplated that the ignition status of the vehicle may be in the RUN or ACCY position to determine whether the keys are properly programmed.

In block 206, an error is detected. The PEPS controller 52 determines an error and may not allow the driver to start the vehicle or to continue with programming the particular key that is in the ignition as a secondary key.

In block 210, the vehicle interface display 12 prompts the PEPS controller 52 to determine the number of keys that are configured as primary keys. In such a case, the PEPS controller 52 counts the number of keys that are programmed as a primary key via the LUT and transmits the signal #PRIKEYS to the vehicle interface display 12. In the event the number of primary keys is equal to one, then the method 200 moves to block 212. In the event the number of primary keys are greater than one, the method 200 moves to block 214.

In block 212, the driver is prevented from programming the current key in the ignition as a secondary key. The method 200 prevents a user from programming all of the keys as a secondary key via the vehicle interface display 12 to ensure that at least one key remains programmed as a primary key.

In block 214, the PEPS controller 52 determines whether the key in the ignition is a primary key or a secondary key based by cross-referencing the key number and/or encrypted data to the key designation as shown under the field 'TYPE' in the LUT. If the PEPS controller 52 determines that the key is a secondary key, then the method 200 moves to block 216. If the PEPS controller 52 determines that the key is a primary key, then the method 200 moves to block 218.

In block 216, the vehicle interface display 12 transmits the signal KEY_STATUS which indicates that the driver is a secondary driver over the multiplexed communication bus to various modules or controllers that are adapted to enable secondary driver features. Again, such secondary driver features may include one or more of, but not limited to, inhibiting a seatbelt restraint status disable, inhibiting a forward collision warning (FCW) disable, inhibiting an electronic stability control (ESC) disable, inhibiting a traction control (TC) disable, adjusting the operation of a low fluid level warning or low fuel level warning, and inhibiting blind spot monitoring and cross traffic alert disable, preventing the user from inputting data via touch entry into a communication device, and preventing the user from disabling the emergency notification feature.

In block 218, the driver initiates the process of configuring the key as a secondary driver by selecting the corresponding field or menu via the switches 18 on the vehicle interface display 12. In response to the driver selecting the corresponding field on the vehicle interface display 12, the interface display 12 transmits the signal SEARCH_BS to the PEPS controller 52. The PEPS controller 52 determines whether the key that is to be programmed as a secondary key has been placed on the back up slot 54.

In block 220, the PEPS controller 52 determines whether the driver has placed the key that is to be programmed on the backup slot 54 within a predetermined time frame. The predetermined time frame may be within 10 to 60 seconds. If the driver has not placed the key on the backup slot 54 within the predetermined time frame, then the method 200 moves to block 222. If the driver has placed the key on the backup slot 54 within the predetermined time frame, then the method 200 moves to block 223. The PEPS controller 52 transmits the status of whether such a key was placed on the backup slot 54 on the signal STATUS_BS to the vehicle interface display 12.

In block 222 the vehicle interface display 12 generates a message which prompts the user to place the key on the backup slot 54.

In block 223, the PEPS controller 52 determines whether the key is already programmed as a secondary key. If the key is already a secondary key, the method 200 ends. If the key is not programmed as a secondary key, the method 200 moves to block 224.

In block 224, the driver selects the corresponding fields in the vehicle interface display 12 to program the current key in the backup slot 54 as a secondary key. In general, the vehicle interface display 12 transmits the signal CHANGE_REQ to the PEPS controller 52 to control the PEPS controller 52 to change the status of the key from a primary key to a secondary key.

In block 226, the PEPS controller 52 updates the 'TYPE' field in the LUT to change the designation for the particular key that is detected to be in the backup slot 54 from a primary key to a secondary key in response to the signal CHANGE_REQ.

Figure 5:
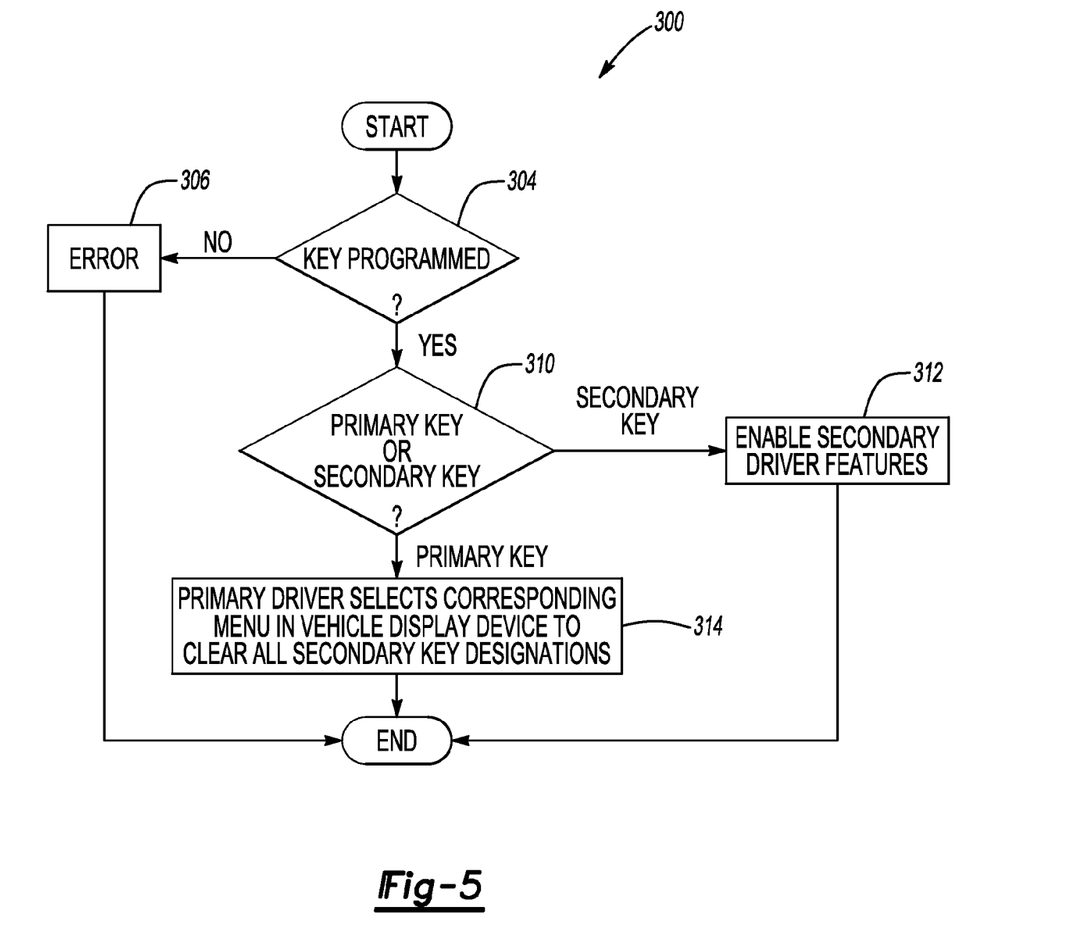
FIG. 5 depicts a method for clearing keys programmed to the vehicle which correspond to primary and secondary drivers via a vehicle interface display in accordance to one embodiment of the present invention.

Referring now to FIG. 5, a method 300 for clearing keys already programmed to the vehicle which correspond to secondary keys via a vehicle interface display is shown in accordance to one embodiment of the present invention. Blocks 304, 306, 310, and 312 are similar to blocks 102, 104, 106, 114 and 116, respectively in the event the method 300 is implemented for a PATS implementation. Blocks 304, 306, 310, and 312 are similar to blocks 204, 206, 214, and 216, respectively in the event the method 300 is implemented for a PEPS implementation.

In block 314, the driver selects the corresponding fields in the vehicle interface display 12 to clear all keys configured or designated as secondary keys. In general, the vehicle interface display 12 transmits the signal CLEAR to the PATS controller 16 or to the PEPS controller 52 to control the PATS controller 16 or the PEPS controller 52 to change the designation for each key number in the LUT that is listed as a secondary key from a secondary key to a primary key.

Figure 6:
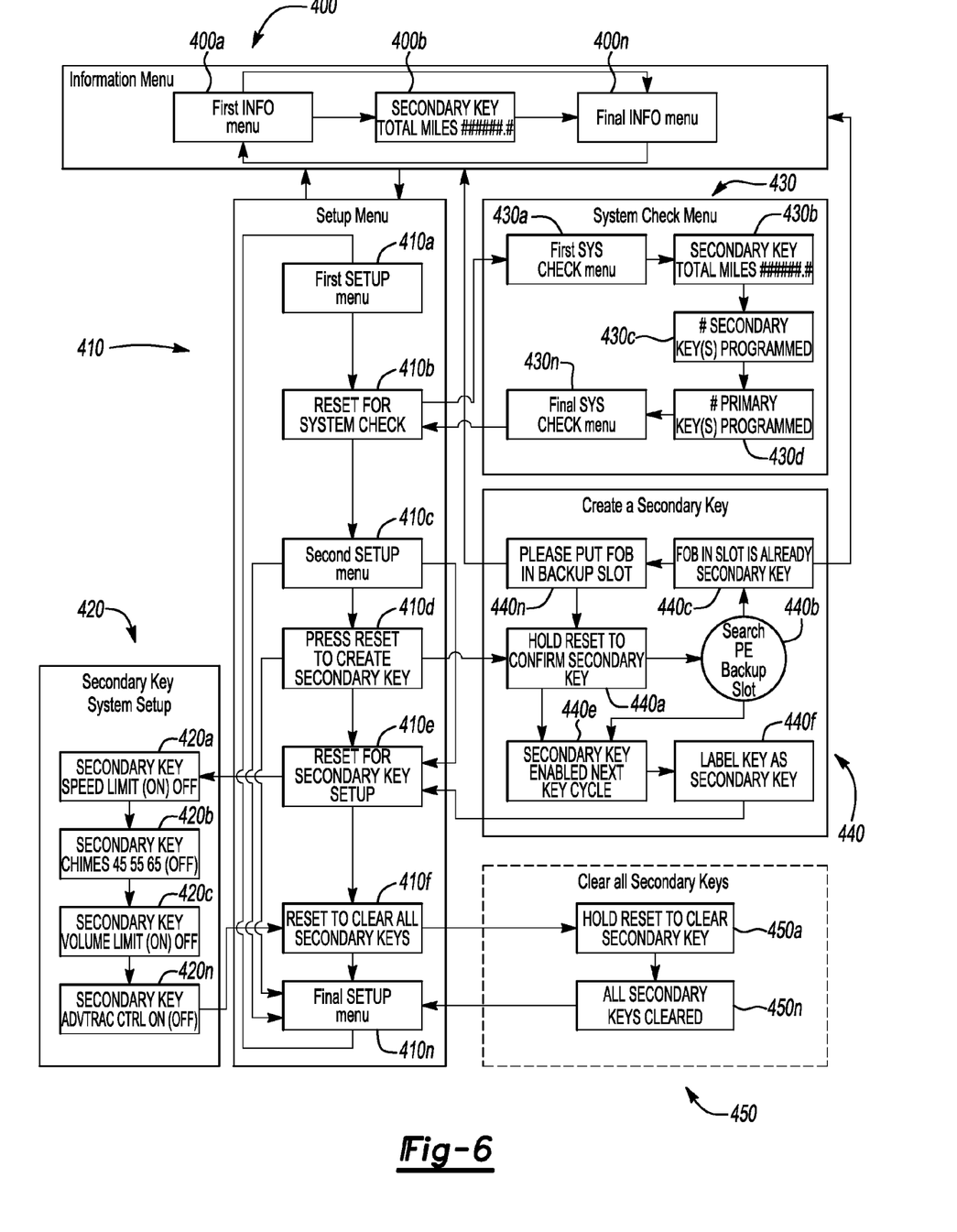
FIG. 6 depicts a plurality of vehicle interface display menus that are presented to a driver to allow the driver to program keys to a vehicle in accordance to one embodiment of the present invention.

Referring now to FIG. 6, a plurality of vehicle interface display menus that are presented to a driver via the vehicle interface display 12 to allow the driver to program keys to a vehicle is shown in accordance to one embodiment of the present invention. The vehicle interface display menus comprise an information menu 400, a setup menu 410, a secondary key system setup menu 420, a system check menu 430, a create secondary key menu 440, and a clear secondary key menu 450.

The information menu 400 includes a first information menu 400a, a secondary key total mile status 400b, and a final information menu 400n. The first and final information menus 400a and 400n may correspond to and not limited to, one or more of a mileage summary, trip distances, miles to empty, and miles per gallon. The secondary key total mile status 400b generally corresponds to the number of miles traveled by the vehicle when the secondary driver drives the vehicle. The secondary key total mile status 400b may be optionally viewable by the primary driver in the event the primary driver wants to know the number of miles that have been accumulated on the vehicle by the secondary driver.

The setup menu 410 includes a first setup menu 410a, a reset for system check 410b, a second setup menu 410c, a reset to create a secondary key menu 410d, a reset for secondary key setup menu 410e, a reset to clear all secondary keys menu 410f, and a final setup menu 410n. The first, second and final setup menus 410a, 410c, and 410n may include menus related to, and not limited to, oil life reset menu, a units (e.g., English or metric) menu, and an auto lock enable and disable menu.

The secondary key system setup menu 420 includes a secondary key speed limit on/off menu 420a, a secondary key chimes on/off menu 420b, a secondary key volume limit on/off menu 420c and a secondary key roll stability on/off menu 420n. The primary driver may access the secondary key system setup menu 420 to enable (turn on) or disable (turn off) the various features related to the menus 420a-420n. The secondary driver may not have access to the secondary key system setup menu 420 in the event the PATS controller 16 or the PEPS controller 52 determines that the driver of the vehicle is the secondary driver based on the signal KEY_ID. To access the secondary key system setup menu 420, the primary driver first selects one or more of the information menus 400a-400n to enter into the secondary key system setup menu 410. From there, the primary driver steps through menus 410a-410e. Upon reaching and selecting the reset for secondary key setup menu 410e, the primary driver is directed to the secondary key system setup menu 420 to enable/disable various secondary driver features via the menus 420a-420n.

The system check menu 430 includes a first system check menu 430a, a secondary key total miles status 430b, the number of secondary keys programmed status 430c, the number of primary keys programmed status 430d and a final system check menu 430n. The first system check menu 430a and the final system check menu 430n may include, but not limited to, any one or more of a percentage of oil life menu, a washer fluid level menu, tire pressure monitoring system status menu, and exterior lamps status menu.

The secondary key total number of miles presented in status 430b may be computed by the vehicle interface display 12 or the engine controller. The vehicle interface display 12 may transmit the signal KEY_STATUS signal to the engine controller to indicate that the key is the secondary key. The engine controller computes the number of miles driven while the secondary driver drives the vehicle with the secondary key.

The number of secondary keys programmed to the vehicle are provided in the status 430c. Such information is sent from the PATS controller 16 or the PEPS controller 52 to the vehicle interface display 12 via the signal #SECKEY. Likewise, the number of primary keys programmed to the vehicle are provided in the status 430d. Such information is sent from the PATS controller 16 or the PEPS controller 52 to the vehicle interface display 12 via the signal #PRIKEY. To access the system check menu 430, the driver via the switches 18, steps through menus 410a-410b. Upon reaching and selecting the reset for system check menu 410b, the driver is directed to the system check menu 430 to view the number of primary and/or secondary keys that are programmed to the vehicle and the total number of miles that the secondary driver has accumulated while driving the vehicle.

The create secondary key menu 440 includes a hold reset to confirm secondary key menu 440a, a key in slot is secondary key status 440c, a please put key in backup slot prompt 440d, a secondary key enabled next key cycle status 440e, and a label key as a secondary key prompt 440f.

To access the create secondary key menu 440, the primary driver steps through menus 410a-410c. Upon reaching and selecting menu 410d, the primary driver is directed to the create secondary key menu 440 to program the key as a secondary key. With the PATS implementation, the primary driver selects the hold reset to confirm secondary key menu 440a via the switch 18. At that point, the vehicle interface display 12 displays the secondary key enabled next key cycle status 440e (e.g., the secondary key will be active on the next key cycle) and the label secondary key status 440f to confirm that the key has been designated as a secondary key (e.g., key designation is changed in the LUT of the PATS controller 16 to reflect that the key is a secondary key).

With the PEPS implementation, a search backup slot operation 440b is performed to determine whether the key that is to be programmed is on the backup slot 54. In the event the key is detected to be on the backup slot 54, and the key is not already programmed as a secondary key, the vehicle interface display 12 displays the secondary key enabled next key cycle status 440e (e.g., the secondary key will be active on the next key cycle) and the label secondary key status 440f to confirm that the key has been designated as a secondary key (e.g., key designation is changed in the LUT of the PEPS controller 52 to reflect that the key is a secondary key).

In the event the key is detected to be already programmed as a secondary key, the vehicle interface display 12 displays the key in slot is secondary key status 440c. In the event the key is not detected on the back up slot 54, the vehicle interface display 12 provides the please put key in backup slot prompt 440d. The vehicle interface display 12 exits the create secondary key menu 430 by entering into the setup menu 410 or the information menu 400.

The clear all secondary key menu 450 includes a hold reset clear secondary key menu 450a and an all secondary key cleared status 450n. In general, upon the user selected the hold reset clear secondary key menu 450a, the PATS controller 16 or the PEPS controller 52 clears all keys that are designated as secondary keys in the respective LUTs and resets such keys so that the keys are assigned a primary key status. In addition, the vehicle interface display 12 resets the total number of miles shown in 400b and 430b to zero to indicate that the secondary keys were changed back to primary keys. Such a condition may indicate to the primary driver that secondary driver may have changed the status of the keys from secondary to primary without the authorization or knowledge of the primary driver. The number of programmed keys are shown in 430c and 430d will change accordingly in response to all of the secondary keys being cleared.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A method for programming keys to a vehicle to establish primary keys and secondary keys to control vehicle functionality, the method comprising:
   receiving a key identification signal from a present key;
   generating a key status signal indicative of the present key being one of a primary key and a secondary key in response to the key identification signal;
   transmitting the key status signal to a vehicle interface display;
   enabling a user to change status of the present key from a primary key to a secondary key with the vehicle interface display after determining that the key status signal corresponds to the primary key;
   determining if the present key is an only remaining key from a plurality of programmed keys that corresponds to the primary key; and
   preventing the user from changing status of the present key from the primary key to the secondary key if the present key is the only remaining key that corresponds to the primary key.

2. The method of claim 1 further comprising preventing the user from changing the status of the present key after determining that the key status signal corresponds to the secondary key.

3. The method of claim 1 further comprising tracking the number of miles driven by the vehicle and displaying the number of miles driven by the vehicle on the vehicle interface display while the vehicle is driven with the present key if the present key is programmed as the secondary key.

4. A system for programming at least one key to a vehicle to establish one of a primary key and a secondary key for controlling vehicle functionality based on whether the at least one key is the primary or the secondary key, the system comprising:
   a controller configured to receive a key identification signal from a present key and to generate a key status signal indicative of whether the present key is one of the primary key and the secondary key in response to the key identification signal;
   a vehicle interface display including at least one switch and configured to:
     receive the key status signal;
     determine whether the key status signal corresponds to one of the primary key and the secondary key;
     enable a user to change a status of the present key via the at least one switch from the primary key to the secondary key after determining that the key status signal corresponds to the primary key;
     determine if the present key is an only remaining key from a plurality of programmed keys that corresponds to the primary key; and
     prevent the user from changing status of the present key from the primary key to the secondary key if the present key is determined to be the only remaining key from the plurality of programmed keys that corresponds to the primary key.

5. The system of claim 4 wherein the vehicle interface display is further configured to allow the user to change status of an additional key with the at least one switch after determining that the key status signal corresponds to the primary key.

6. The system of claim 4 wherein the key identification signal corresponds to at least one of received key serial number and received encryption data that is used to authorize an engine start and the controller including a look up table having at least one of stored key serial number and the stored encryption data.

7. The system of claim 6 wherein the controller is further configured to compare the at least one of the received key serial number and the received encryption data to the at least one of the stored key serial number and the stored encryption data to determine whether the present key is the primary key or the secondary key.

8. The system of claim 4 wherein the vehicle interface display is further configured to display a total number of keys that are programmed as primary keys and a total number of keys that are programmed as secondary keys.

9. The system of claim 4 wherein the controller is a Passive Anti-Theft System (PATS) controller and data included within the key identification signal is used to authenticate starting an engine of the vehicle.

10. The system of claim 4 wherein the controller is a Passive Entry Passive Start (PEPS) controller and data included within the key identification signal is used to perform at least one of granting access to an occupant for entry into the vehicle and authenticating engine startup of the vehicle.

11. The system of claim 4 further comprising a backup slot configured to receive the present key and wherein the controller is a Passive Entry Passive Start (PEPS) controller operably coupled to the backup slot such that prior to allowing the user to change status of the present key from the primary key to the secondary key with the at least one switch of the vehicle interface display, the present key is inserted into the backup slot.

12. A system for programming at least one key to a vehicle to establish one of a primary key and a secondary key for controlling vehicle functionality based on whether the at least one key is the primary or the secondary key, the system comprising:
   a controller configured to receive a key identification signal from a present key and to transmit a key status signal indicative of whether the present key is one of a primary key and a secondary key in response to the key identification signal;
   a vehicle interface display configured to:
     receive the key status signal;
     determine whether the key status signal corresponds to one of the primary key and the secondary key;
     enable a user to change a status of the present key from the primary key to the secondary key after determining that the key status signal corresponds to the primary key;
     determine if the present key is an only remaining key from a plurality of programmed keys that corresponds to the primary key; and
     prevent the user from changing status of the present key from the primary key to the secondary key if the present key is determined to be the only remaining key from the plurality of programmed keys that corresponds to the primary key.

13. The system of claim 12 wherein the key identification signal corresponds to at least one of received key serial number information and received encryption data and the controller includes a look up table having at least one of stored key serial number information and stored encryption data.

14. The system of claim 13 wherein the controller is further configured to compare the at least one of received key serial number information and received encryption data to the at least one of stored key serial number information and the stored encryption data to determine whether the present key is the one of the primary key and the secondary key.

15. The method of claim 1 further comprising electronically transmitting the key identification signal from the present key prior to receiving the key identification signal.

16. The system of claim 4 wherein the present key is configured to electronically transmit the key identification signal prior to the controller receiving the key identification signal.

17. The system of claim 12 wherein the present key is configured to electronically transmit the key identification signal prior to the controller receiving the key identification signal.

18. A method for programming keys to a vehicle, the method comprising:
   electronically transmitting a key identification signal from a present key;
   determining whether the key identification signal corresponds to one of a primary key and a secondary key;
   enabling a user to change status of the present key from the primary key to the secondary key with a vehicle interface display after determining that the present key corresponds to the primary key;
   determining if the present key is an only remaining key from a plurality of programmed keys that corresponds to the primary key; and
   preventing the user from changing status of the present key from the primary key to the secondary key if the present key is detected to be the only remaining key from a plurality of programmed keys that corresponds to the primary key.

19. The method of claim 18 further comprising preventing the user from changing the status of the present key after determining that the key status signal corresponds to the secondary key.

20. An apparatus for programming at least one key to a vehicle to establish one of a primary key and a secondary key, the apparatus comprising:
   a present key for transmitting a key identification signal to a controller that transmits a key status signal indicative of the present key being one of a primary key and a secondary key, in response to the key identification signal, to a vehicle interface device that (i) receives the key status signal, (ii) determines whether the key status signal corresponds to the one of the primary key and the secondary key, (iii) enables a user to change a status of the present key from the primary key to the secondary key after determining that the key status signal corresponds to the primary key, (iv) determines if the present key is an only remaining key from a plurality of programmed keys that corresponds to the primary key, and (v) prevents the user from changing status of the present key from the primary key to the secondary key if the present key is determined to be the only remaining key from the plurality of programmed keys that corresponds to the primary key.

21. The apparatus of claim 20 wherein the vehicle interface device is further configured to display a total number of keys that are programmed as primary keys and a total number of keys that are programmed as secondary keys.

* * * * *